United States Patent [19]

Clifton

[11] 4,207,085
[45] Jun. 10, 1980

[54] AIR CLEANER AIR EXPANSION CHAMBER CONSTRUCTION

[75] Inventor: Colin R. Clifton, Basildon, England

[73] Assignee: Ford Motor Company, Dearborn, Mich.

[21] Appl. No.: 961,423

[22] Filed: Nov. 16, 1978

[51] Int. Cl.² ............................................. B01D 50/00
[52] U.S. Cl. ................................... 55/276; 55/319; 55/414; 55/510; 181/231; 181/265; 181/269
[58] Field of Search .............. 55/276, 410, 413, 414, 55/416, 510, 319, DIG. 21; 181/249, 264, 265, 266, 267, 268, 269, 270, 279, 280, 281, 231

[56] References Cited

U.S. PATENT DOCUMENTS

| 2,783,855 | 3/1957 | Karn et al. ............................ 55/276 |
| 2,905,265 | 9/1959 | McMullen ............................. 55/276 |
| 3,530,840 | 9/1970 | Freyn ................................... 181/204 |
| 3,672,773 | 6/1972 | Moller .................................. 55/276 |

FOREIGN PATENT DOCUMENTS

| 478899 | 6/1929 | Fed. Rep. of Germany .......... 181/279 |
| 849337 | 9/1960 | United Kingdom .............. 55/DIG. 21 |
| 1039130 | 8/1966 | United Kingdom . |

*Primary Examiner*—David L. Lacey
*Attorney, Agent, or Firm*—Robert E. McCollum; Clifford L. Sadler

[57] ABSTRACT

An internal combustion engine air cleaner assembly has a lower supporting tray wall, a top cover or enclosure wall, and a side wall, together defining a hollow air expansion chamber containing a filter element; the chamber has an air inlet and an outlet opening to the engine that lies in the plane of the lower wall, the outlet being part of an angled outlet orifice cowl asymmetrically positioned with respect to the centerline of the surrounding side and top walls and surrounding the outlet and having an inlet that is in a plane inclined to the planes of the top and side walls to reduce noise.

5 Claims, 5 Drawing Figures

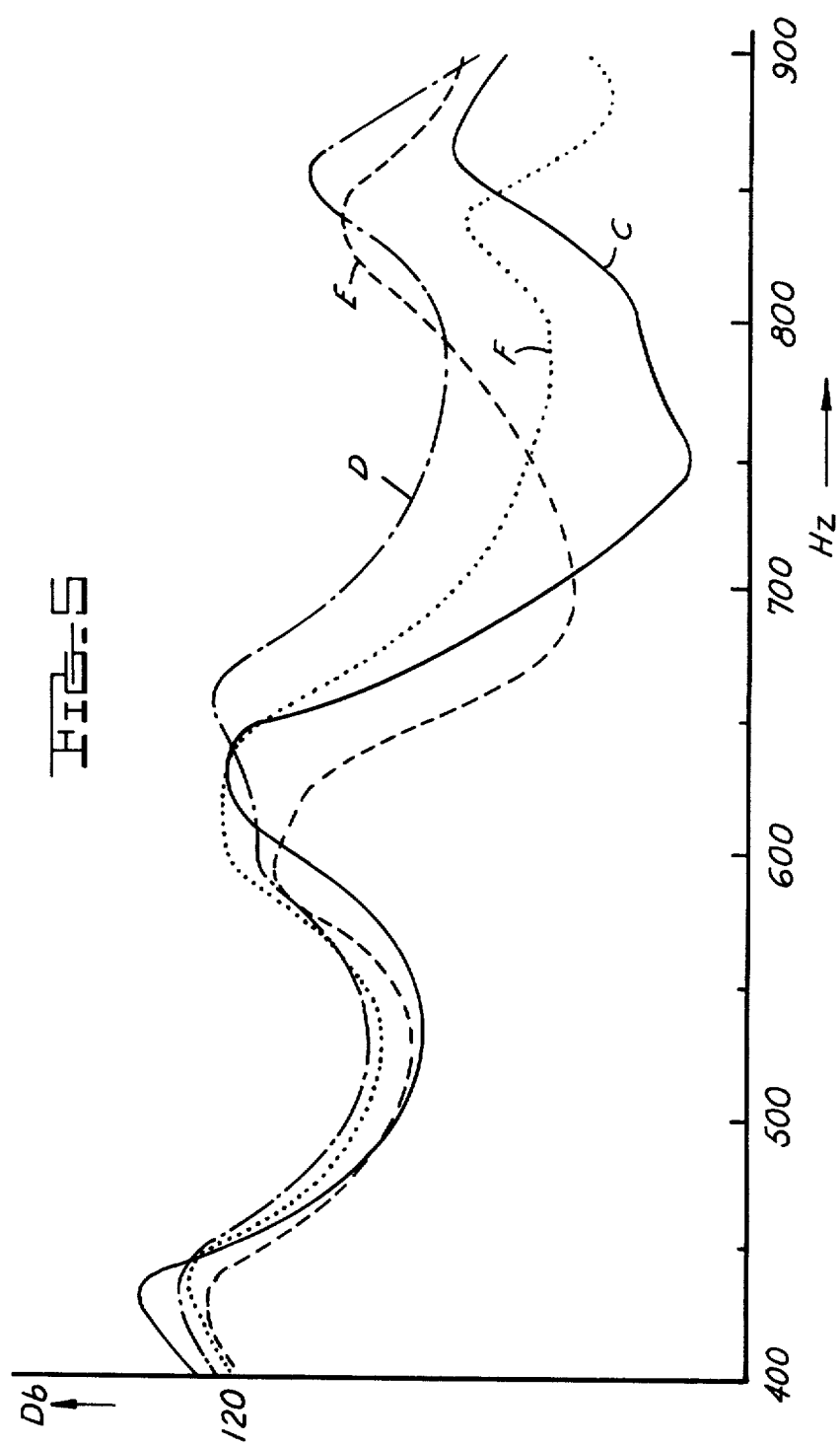

AIR CLEANER AIR EXPANSION CHAMBER CONSTRUCTION

The present invention relates to air expansion chambers for air cleaner assemblies or exhaust systems of internal combustion engines.

Air cleaner or air filter assemblies for internal combustion engines comprise one or more expansion chambers through which air passes before entering the intake system of the engine, an air filter being mounted in at least one of the chambers. For example, in one conventional single chamber air filter assembly, the expansion chamber comprises a lower supporting tray surface on which a removable annular air filter may be positioned, an annular side wall surrounding the supporting surface, and an upper cover member or closure. The air filter usually is held centrally within the chamber between the supporting surface and the closure, and air is drawn through the filter from a snorkel type air inlet in the side wall to an air outlet positioned centrally in the lower supporting tray surface.

The shape and relative positions of the inlet and outlet to the expansion chamber must be so positioned that the air filter assembly does not interfere with the surrounding components of the engine on which it is mounted. For this reason, we have found it desirable to mount the outlet from the expansion chamber to the engine asymmetrically with respect to the surrounding side wall of the chamber. Where the outlet is in the form of a simple aperture or opening in one wall of the chamber, however, the chamber generates undesirably high noise levels within certain operating frequencies of the engine.

Similarly, asymmetrical outlet orifices in expansion chambers of exhaust systems can generate high noise levels.

The present invention relates to an air expansion chamber construction in which the noise levels are substantially reduced from known construction of expansion chambers having asymmetrically located air outlets to the engine by forming the outlet orifice in a cowl within the chamber so that the outlet orifice is inclined to the plane of the wall in which it is mounted.

British Patent Specification No. 1,039,130 shows an air cleaner assembly having an air expansion chamber with an asymmetrically located outlet tube 23 and a baffle 24. However, the outlet is offset to one side of the air cleaner lower tray or wall, does not face the inlet, and is in the plane of the lower wall. Also, the baffle is only part cylindrical and does not surround the outlet, and is not inclined and is parallel to the direction of outlet flow or perpendicular to the plane of the outlet. The combined construction is believed to result in the emission of sound waves asymmetrically from the outlet tending to establish undesirable standing waves in the air expansion chamber.

The present invention overcomes the above disadvantages by specifically providing an expansion chamber for an air filter cleaner assembly or an exhaust system of an internal combustion engine comprising an air inlet to the chamber and and an air outlet in one wall of the chamber, the air outlet being positioned asymmetrically with respect to surrounding walls of the chamber and including a cowl defining an outlet orifice in which the inlet to the cowl is inclined to the plane of the said one wall.

In one embodiment of the invention, the expansion chamber is constructed to accommodate an air filter element which is positioned on a lower wall around the outlet, and an upper or top wall opposite the said one wall comprises a removable cover or closure allowing access to the expansion chamber for installation and removal of the filter element. The inlet to the outlet orifice is so inclined that the plane of the inlet intersects the top wall or cover opposite the said one lower wall. In general, the plane of the inlet to the outlet orifice may be inclined to the supporting lower wall surface at any angle up to 90°. Preferably, however, the angle of inclination is from 10° to 60°, and more desirably from 15° to 30°.

Usually the outlet orifice will be oriented to face across the largest dimension of the said one lower wall.

In order to improve air flow through the outlet, a modification may be incorporated in which the inlet to the outlet orifice is preferably defined by an outwardly flared lip on the cowl.

The air cleaner tray per se may be manufactured from any suitable material, for example pressed steel or a molded plastics material.

The invention will not be described, by was of example only, with reference to the accompanying drawings in which:

FIG. 5 graphically illustrates the sound characteristics of prior art as well as air filter assemblies constructed according to the invention.

Figure 1:
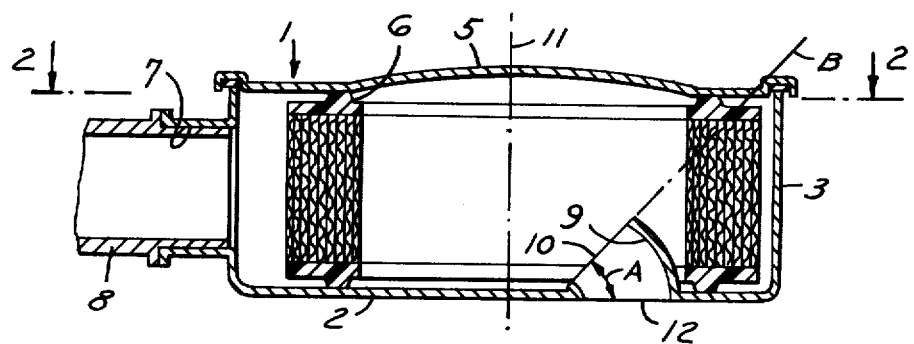
FIG. 1 is a vertical cross-section through a first embodiment of an air filter assembly incorporating an expansion chamber constructed in accordance with the invention.
Figure 2:
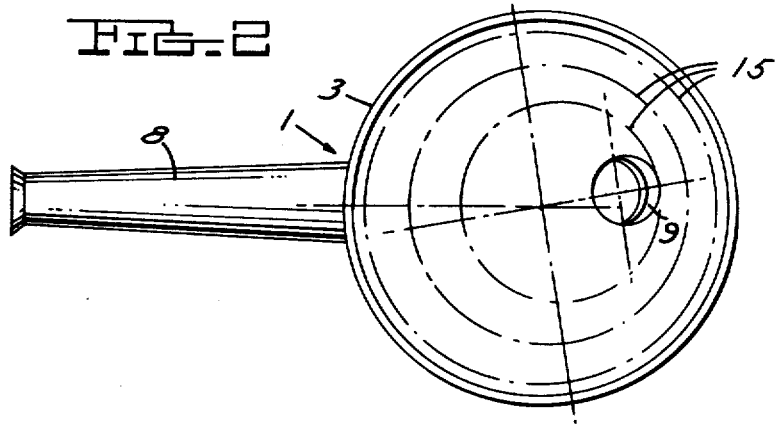
FIG. 2 is a cross-sectional view of the assembly of FIG. 1 on a reduced scale taken on a plane indicated by and viewed in the direction of the arrows 2—2 of FIG. 1, with its filter removed.

Referring to FIGS. 1 and 2, the air filter assembly 1 includes an expansion chamber defined by a lower supporting wall or tray 2 and an integral annular side wall 3. In the embodiment illustrated, the annular side wall 3 is circular in plan, but other shapes may be used. A top closure wall or cover 5 is mounted on the top edge of the side wall 3 by a conventional releasable fastener (not shown), and forms an airtight seal with the wall 3.

An annular dry element type filter cartridge 6 is positioned between the cover 5 and the bottom supporting wall 2 and is held in sealing engagement therewith.

The side wall 3 has an air inlet orifice 7 in which a snorkel type air feed tube 8 is mounted. The supporting bottom wall 2 is provided with an angled tubular or cylindrical cowl 9, which defines a circular outlet orifice 10. The cowl is located offset from the vertical centerline 11 of the supporting wall 2 and cover 5 and is so shaped that the outlet orifice 10 lies in a plane indicated by dotted line B which is inclined at an angle A to the horizontal plane of the supporting wall 2. In the embodiment illustrated, the angle A is 45°, and the plane B of the orifice 10 passes through the closure 5, as indicated in FIG. 1. As best seen from FIG. 2, the outlet orifice 10 faces across the largest dimension of the air chamber generally towards the inlet orifice 7. The precise angle of inclination A of the outlet orifice 10 and its orientation with respect to the inlet orifice 7 will vary according to the exact construction of the air cleaner tray and is determined by simple experiment.

In use, the air cleaner assembly 1 is mounted on an internal combustion engine so that the lower end 12 of cowl 9 lies essentially in the plane of wall 2 and communicates with the carburetor of the engine. The fact that the cowl 9 is offset from the center of the supporting wall 2 facilitates accommodation of the assembly adjacent bulky engine components, and the inclination of the outlet orifice 10 reduces the level of noise which would otherwise be generated in the air expansion chamber.

Figure 3:
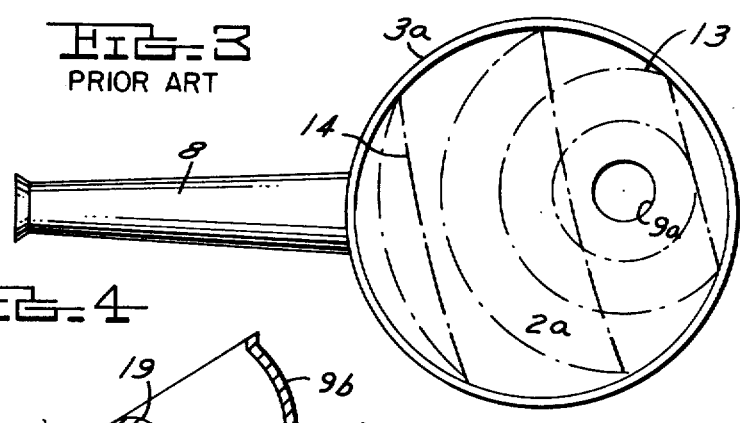
FIG. 3 is a view similar to that of FIGS. 1 and 2 but of a prior art expansion chamber not constructed in accordance with the invention.

Although we do not wish to be limited by any theoretical explanation of the operation of the expansion chamber, we believe that the inclination of the plane of the outlet orifice 10 reduces the possibility of reverberation in the air expansion chamber. FIG. 3 illustrates a prior art air expansion chamber of a shape and size similar to that of FIGS. 1 and 2 but in which the outlet orifice 9a lies in the plane of the supporting wall 2a. We believe that, in the chamber of FIG. 3, opposite portions of the sound waves emitted from the orifice, as indicated by broken lines 13, meet opposite sides of the annular wall 3a at different times, and, therefore, interfere with the sound waves indicated by the broken lines 14 that are reflected from the walls 3a. At certain frequencies, this interference will be additive, thus causing the chamber to generate a loud note.

By contrast, in the chamber of the present invention, all portions of the sound waves, shown in dotted lines at 15 in FIG. 2, generated at the outlet orifice 10, meet the side wall 3 substantially simultaneously. Reflected waves from the walls, therefore, do not interfere additively with the original waves. In this respect, the wave forms 15 within the chamber are similar to those of conventional expansion chambers in which the outlet is located centrally in the supporting wall. The levels of noise generated by such chambers are usually completely acceptable.

The audible characteristics of a number of chambers are graphically illustrated in FIG. 5. Curve C was obtained using a conventional air filter assembly having a chamber shape similar to that of FIG. 1, except that the outlet orifice was located centrally in the bottom supporting wall. The chamber was connected to a loudspeaker system capable of emitting signals in the frequency range of 30-1000 Hz, and the sound emitted from the chamber was detected and its frequency analyzed using conventional sound analysis equipment. FIG. 5 illustrates the variation in intensity of the sound emitted by the chamber over the frequency range 400 to 900 Hz, which is the range in which greatest variation in intensities is observed with the chambers tested. The intensity is recorded on the ordinate in decibels and the frequency is recorded on the abscissa in Hertz. As can be seen in FIG. 5, the frequency curve exhibits three maxima in the region of 450, 650 and 850 Hz. The noise emitted by the chamber when fitted to a vehicle was acceptable.

Curve D was obtained using a chamber constructed similar to the prior art construction illustrated in FIG. 3. The noise lever emitted by a chamber constructed in this manner was generally much higher in the higher Hz ranges than that of the curve C type chamber. The curve D type chamber also exhibits three maxima at approximately the same frequencies as curve C. However, it will be seen that the level of sound of curve D emitted at frequencies above 650 Hz is much higher, indicating that general increase in noise which produced unacceptable noise levels when fitted to a vehicle.

Curve E was obtained using a chamber construction similar to that of FIG. 1, except that the cowl 9 was curved through 90° (i.e., the angle A is equal to 90°). The noise emitted by this chamber construction was less than that emitted by the curve D type chamber and would have been acceptable for commercial use. The level, however, was greater than that emitted by the curve C type chamber. The curve E also exhibits three maxima at about 430, 650 and 850 Hz. In contrast to curve D, however, the sound levels at frequencies about 650 Hz are greatly reduced.

Curve F was obtained using a chamber again constructed similar to that of FIG. 1 but in which the angle A of the cowl 9 was 20°. The noise emitted by this type chamber construction was less at the higher Hz levels than that of either the curve D or curve E type chambers. Thus, the audible frequency distribution curve exhibits three maxima as do curves C to E, but the maximum at about 850 Hz is no greater than that for curve C, and the levels for frequencies in the range 750 to 800 Hz are substantially less than those of curves D and E.

Figure 4:
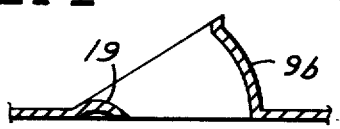
FIG. 4 is an enlarged cross-sectional view of a detail illustrating an alternative construction.

FIG. 4 illustrates an alternative construction for the cowl 9b of a chamber in accordance with the invention. The outlet orifice of the cowl 9b is in the form of an outwardly flared lip 19 which smooths the passage of air through the cowl and thereby reduces the restriction on the air flow which is produced by sharp edged orifices.

Both embodiments of the invention may be manufactured economically and easily as plastics moldings or, alternatively, as metal pressings.

Although the embodiments of the invention described above are expansion chambers for air filter assemblies of internal combustion engines; the invention is equally applicable to expansion chambers of engine exhaust systems.

While the invention has been described and illustrated in its preferred embodiments, it will be clear to those skilled in the arts to which it pertains, that many changes and modifications may be made thereto without departing from the scope of the invention.

I claim:

1. An air cleaner having top and bottom walls and a side enclosing wall defining a hollow air expansion chamber, an air filter element in said chamber, an air inlet to the chamber located in the side wall, and an air outlet in the bottom wall of the chamber in a plane essentially at right angles to the plane containing the inlet, said filter element being positioned in said chamber such that air flows from said air inlet through said element and out through said air outlet, the air outlet also being positioned asymmetrically with respect to the top wall and surrounding side wall of the chamber and including a cowl extending from said outlet into said chamber and the lower portion of said cowl being essentially in the plane of the said bottom wall to provide outlet flow of air in a direction perpendicular to the plane of the outlet and said cowl having an inlet in a plane that is inclined to the plane of said bottom wall and directed toward said air inlet.

2. An air cleaner according to claim 1, wherein the plane containing the cowl inlet is so inclined that its plane intersects the top wall.

3. An air cleaner according to either of claims 1 or 2, wherein the cowl inlet is oriented to face across the largest dimension of the said bottom wall.

4. An air cleaner according to claim 1, wherein the cowl inlet is inclined at an angle of from 15° to 60° to the plane of the said bottom wall.

5. An air cleaner according to claim 1, wherein the cowl inlet is defined by an outwardly flared lip of the cowl.

* * * * *